United States Patent
Ahrens

(10) Patent No.: US 9,303,144 B2
(45) Date of Patent: Apr. 5, 2016

(54) DISPERSING AGENT FROM RENEWABLE RAW MATERIALS FOR BINDING AGENT-FREE PIGMENT PREPARATIONS

(71) Applicant: Hendrik Ahrens, Kriftel (DE)

(72) Inventor: Hendrik Ahrens, Kriftel (DE)

(73) Assignee: CLARIANT INTERNATIONAL LTD., Muttenz (CH)

( * ) Notice: Subject to any disclaimer, the term of this patent is extended or adjusted under 35 U.S.C. 154(b) by 0 days.

(21) Appl. No.: 14/434,060

(22) PCT Filed: Sep. 4, 2013

(86) PCT No.: PCT/EP2013/002650
§ 371 (c)(1),
(2) Date: Apr. 7, 2015

(87) PCT Pub. No.: WO2014/056561
PCT Pub. Date: Apr. 17, 2014

(65) Prior Publication Data
US 2015/0252174 A1    Sep. 10, 2015

(30) Foreign Application Priority Data
Oct. 9, 2012  (DE) .......................... 10 2012 019 786

(51) Int. Cl.
| | | |
|---|---|---|
| C09D 11/03 | (2014.01) | |
| C09D 11/033 | (2014.01) | |
| C09B 67/00 | (2006.01) | |
| C09D 4/00 | (2006.01) | |
| C09D 5/00 | (2006.01) | |
| C09D 17/00 | (2006.01) | |
| C08K 5/3417 | (2006.01) | |
| C09D 11/037 | (2014.01) | |
| C09B 67/46 | (2006.01) | |
| C08K 3/04 | (2006.01) | |
| C08K 3/22 | (2006.01) | |
| C08K 3/34 | (2006.01) | |
| C08K 5/23 | (2006.01) | |
| C09D 11/00 | (2014.01) | |
| C08K 5/20 | (2006.01) | |

(Continued)

(52) U.S. Cl.
CPC ................ C08K 5/3417 (2013.01); C08K 3/04 (2013.01); C08K 3/22 (2013.01); C08K 3/346 (2013.01); C08K 5/20 (2013.01); C08K 5/23 (2013.01); C08K 5/52 (2013.01); C08K 5/521 (2013.01); C09B 67/009 (2013.01); C09D 11/00 (2013.01); C09D 11/037 (2013.01); C09D 17/001 (2013.01); C08K 2003/2272 (2013.01); C08K 2003/2275 (2013.01)

(58) Field of Classification Search
CPC ........ C09D 11/03; C09D 11/033; C09D 4/00; C09D 5/00; C09D 17/001; C09D 17/003; C09D 17/004; C09D 17/007; C09D 17/008; C09B 67/0066

USPC ............. 106/31.75, 31.67, 31.86, 287.25, 106/287.26, 287.3, 487, 499, 503, 504
See application file for complete search history.

(56) References Cited

U.S. PATENT DOCUMENTS

| | | | |
|---|---|---|---|
| 1,863,331 | A | 6/1932 | Hailwood et al. |
| 1,986,029 | A | 1/1935 | Todd et al. |
| 2,043,397 | A | 6/1936 | Shaw |

(Continued)

FOREIGN PATENT DOCUMENTS

| | | |
|---|---|---|
| CA | 2127644 | 1/1995 |
| CA | 1338237 | 4/1996 |

(Continued)

OTHER PUBLICATIONS

International Search Report for PCT/EP2013/002650, dated Nov. 7, 2013.

(Continued)

*Primary Examiner* — Helene Klemanski
(74) *Attorney, Agent, or Firm* — Tod A. Waldrop

(57) ABSTRACT

The invention relates to aqueous, binding agent-free pigment preparations, containing (A) 1.0 to 75.0 wt % of at least one organic or inorganic white or colored pigment or a mixture of various organic and inorganic white or colored pigments, (B) 0.01 to 8.0 wt. % of at least one phosphatide of formula (I), wherein R represents a group containing a carbon, hydrogen, oxygen atom and optionally a nitrogen and sulfur atom group, (C) 0.01 to 12.0 wt. % of a polyhydroxy fatty acid amide of formula (II) in which $R^3CO$ represents an acyl group of caproic acid, caprylic acid, capric acid, lauric acid, myristic acid, palmitic acid, palmoleinic acid, stearic acid, isostearic acid, oleic acid, elaidic acid, petroselinic acid, linoleic acid, linolenic acid, arachidic acid, gadoleic acid, behenic acid or erucic acid or their technical mixtures, $R^4$ represents a hydrogen atom or a $C_1$ to $C_4$ alkyl group and q represents 3 and 4.

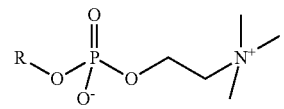

(I)

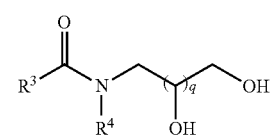

(II)

18 Claims, No Drawings

(51) Int. Cl.
*C08K 5/52* (2006.01)
*C08K 5/521* (2006.01)

(56) References Cited

U.S. PATENT DOCUMENTS

| | | | |
|---|---|---|---|
| 2,068,066 A | | 1/1937 | O'Brien |
| 2,130,554 A | * | 9/1938 | Lusseyran ................ 106/272 |
| 2,271,409 A | * | 1/1942 | Thurman .................... 554/80 |
| 2,294,381 A | | 9/1942 | Burdick |
| 2,337,597 A | | 12/1943 | Hall |
| 2,342,641 A | | 2/1944 | Cassel |
| 2,965,510 A | | 12/1960 | Carroll et al. |
| 4,221,601 A | * | 9/1980 | Augustin et al. ........... 106/499 |
| 4,562,007 A | | 12/1985 | Stühler |
| 4,963,652 A | * | 10/1990 | Tortorici et al. ........... 524/604 |
| 5,380,891 A | * | 1/1995 | Connor et al. ............... 554/69 |
| 5,830,483 A | | 11/1998 | Seidel et al. |
| 7,459,017 B2 | * | 12/2008 | Ortalano et al. ........... 106/499 |
| 8,772,358 B2 | * | 7/2014 | Baseeth et al. ............. 106/504 |
| 8,968,462 B2 | * | 3/2015 | Ahrens ....................... 106/499 |
| 2002/0152927 A1 | * | 10/2002 | Russell et al. ........... 106/31.75 |
| 2014/0066347 A1 | * | 3/2014 | Baseeth et al. ............. 106/503 |

FOREIGN PATENT DOCUMENTS

| | | |
|---|---|---|
| DE | 3240892 | 5/1984 |
| DE | 4322874 | 1/1995 |
| GB | 938 475 | 10/1963 |
| GB | 2 138 428 | 10/1984 |
| GB | 2 458 939 | 10/2009 |
| WO | WO 90/03977 | 4/1990 |
| WO | WO 90/07516 | 7/1990 |
| WO | WO 92/06071 | 4/1992 |
| WO | WO 92/06073 | 4/1992 |
| WO | WO 92/08687 | 5/1992 |
| WO | WO 95/22313 | 8/1995 |
| WO | WO 2010/056833 | 5/2010 |
| WO | WO 2014/056562 A1 * | 4/2014 |
| WO | WO 2014/056563 A1 * | 4/2014 |

OTHER PUBLICATIONS

International Search Report for PCT/EP2013/002652, dated Nov. 7, 2013.
International Preliminary Report on Patentability for PCT/EP2013/002650, dated Apr. 23, 2015.
International Preliminary Report on Patentability for PCT/EP2013/002652, dated Apr. 9, 2015.
Ullmanns's Enzyklopädie für Industrielle Chemie, vol. 14, pp. 119-123, 2012 Wiley-VCH Verlag GmbH & Co. KGaA, Weinheim, no month available.
Lippits, et al., "Direct conversion of ethanol into ethylene oxide on copper and silver nanoparticles: Effect of addition of CeOx and Li2O", Catalysis Today, vol. 154, issues 1-2, Sep. 1, 2010, pp. 127-132.

* cited by examiner

DISPERSING AGENT FROM RENEWABLE RAW MATERIALS FOR BINDING AGENT-FREE PIGMENT PREPARATIONS

The present invention relates to aqueous, binder-free pigment preparations which comprise the phosphatides and polyhydroxy fatty acid amides, and also to their use for coloring macromolecular materials of all kinds, such as, for example, fiber materials, paper stock coloring, coating materials, paints, inks, and the use thereof for the printing of two-dimensional sheetlike structures such as, for example, paper, cardboard packaging, plastic, textiles, and leather.

According to the prior art, a multitude of compounds are proposed, as suitable wetting agents and dispersants, that are typically prepared from petrochemical raw materials. More recently, a search has been on for alternative synthesis routes and raw materials sources to provide access to resource-sparing wetting agents and dispersants, and using renewable, plant-based raw materials sources.

According to the prior art, a multitude of compounds are already known that are obtainable from renewable raw materials sources and that find use as wetting agents and dispersants for pigment preparations, paints, and inks. Hydrolysis of natural fats, oils, waxes, and resins provides access to natural, ionic compounds such as natural acids and phosphatides, which can be used as dispersants for pigments.

U.S. Pat. No. 1,863,331 describes pigment pastes which comprise ammonium oleate as dispersant.

U.S. Pat. No. 1,986,029 describes linseed fatty acids as auxiliaries for the production of solventborne pigment preparations.

U.S. Pat. No. 2,043,397 describes castor oil for a dispersant in offset printing pastes.

U.S. Pat. No. 2,068,066 describes natural fatty acids such as stearic acid, oleic acid, palmitic acid, and lauric acid for the surface treatment of inorganic pigments.

U.S. Pat. No. 2,130,554 describes lecithin for a dispersant for pigment suspensions in organic solvents.

U.S. Pat. No. 2,271,409 describes phosphatides such as soybean oil lecithin, for example, for dispersants in soaps.

U.S. Pat. No. 2,294,381 describes naphtholic acid for the surface treatment of pigments.

U.S. Pat. No. 2,337,597 describes tannic acid for a dispersant for clay mineral pigments.

U.S. Pat. No. 2,342,641 describes tannic acid for a dispersant in pigment coloring methods.

U.S. Pat. No. 2,965,510 describes rosin acid for a dispersant for carbon black pigments.

WO-2010/056833 teaches compositions which comprise lecithin and nonionic surfactants.

Besides ionic compounds there are also nonionic compounds known that may be obtained from renewable raw materials. Fatty alcohol ethoxylates are prepared by reaction of fatty alcohols with ethylene oxide. Ullmanns's Enzyklopädie für industrielle Chemie (vol. 14, pages 119-123, 2012 Wiley-VCH Verlag GmbH & Co. KGaA, Weinheim) teaches the preparation of fatty alcohols from natural fatty acids. Lippits and Nieuwenhuys, in their publication "Direct conversion of ethanol into ethylene oxide on copper and silver nanoparticles: Effect of addition of CeOx and $Li_2O$" (Catalysis Today, volume 154, issues 1-2, 1 September 2010, pages 127-132, published by Elsevier Verlag), teach the preparation of ethylene oxide from ethanol. Ethanol is obtained industrially by fermentation of beet or cane sugar. By this synthesis route, therefore, it is also possible to gain access to biobased fatty alcohol ethoxylates which can be used as nonionic dispersants for pigments.

Another biobased raw material is glycerol, which is obtained by hydrolysis of natural fats and oils.

Other nonionic compounds based on renewable raw materials are sugar-based surfactants, alkyl-polyglycosides, and alkylglucamides.

DE-3240892 describes carboxylic esters of hexitols for high-grade emulsifiers and lubricants.

WO-95/022313 describes emulsifiers based on sugar building blocks, alkyl radicals, and polyglycerol units for cosmetics formulations, which are obtained from renewable raw materials.

WO-90/03977 and WO-90/07516 describe the preparation of alkyloligoglycosides.

WO-92/06071, WO-92/06073, WO-92/08687, and DE-4322874 describe processes for preparing alkylglucamides and their use in detergents, cleaning agents, and textile treatment agents.

A disadvantage of the known compounds from renewable raw materials sources is often the relatively poor dispersing action in pigment preparations, paints, and inks in comparison to petrochemical-based compounds. For instance, natural acids have a poorer dispersing action because they form alkaline earth metal salts which are of relatively low solubility and which precipitate in water, and their dispersing action is heavily pH-dependent, since natural acids are protonated under acidic conditions and lose their ionic character.

The object of the present invention was to find wetting agents and dispersants which are prepared from renewable raw materials and which can be used to produce stable and fluid, aqueous pigment preparations which over a relatively long time show no sedimentation of the pigments used, and with which aqueous and solventborne paints, varnishes, and stains can equally be colored. In the tinting of aqueous varnishes and paints, more particularly emulsion paints, silicate emulsion paints, and aqueous silicone resin paints, the pigment preparations of the invention ought not to show any rubout problems.

Furthermore, the aqueous pigment preparations are also to be compatible with solventborne varnishes, to be homogeneously dispersible in the varnish by mixing, stirring, or shaking, and to produce a consistent, even paint outcome when applied by brush or roller to surfaces. Also serving for the compatibility of the aqueous pigment preparations is the rubout test, which is carried out in the manner described in U.S. Pat. No. 3,840,383. In order to allow compatibility of the aqueous pigment preparations for as great as possible a number of paints and varnishes, the use of binders in the production of the pigment preparations of the invention is avoided. Binders are polymers or resins which are in solution in a suitable solvent and dry physically, chemically, thermally, oxidatively, or with radiation curing. During the drying process, the polymers or resins form films and serve as binders for the pigments and fillers used in a coating material. Since binders may also possess dispersing properties, they are popularly used in combination with low molecular weight wetting agents and dispersants for the production of pigment preparations. A disadvantage of the use of a binder is the restriction on the usefulness of the pigment preparation, since only similar binders can be combined with one another.

A further object of the invention was to provide aqueous pigment preparations featuring low potential in terms of human toxicology, and posing a low level of environmental hazard. Volatile organic compounds having a boiling point of <250° C. (VOC contents) are not to be added explicitly to the aqueous pigment preparations.

Surprisingly it has been found that pigment preparations which comprise phosphatides of the formula (I) in combination with alkylglucamides achieve this object.

The invention accordingly provides aqueous, binder-free pigment preparations comprising (A) 1.0 to 75.0 wt % of at least one organic or inorganic white or chromatic pigment or a mixture of different organic and inorganic white or chromatic pigments, (B) 0.01 to 8.0 wt % of at least one phosphatide of the formula (I),

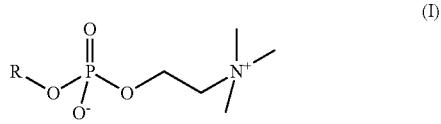

in which

R is an aliphatic radical comprising a total of up to 50 atoms selected from carbon, hydrogen, and oxygen atoms, and optionally nitrogen and sulfur atoms, (C) 0.01 to 12.0 wt % of a polyhydroxy fatty acid amide of the formula (II)

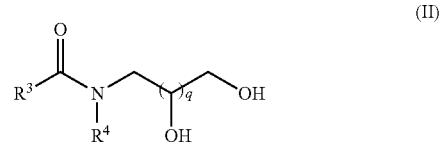

in which $R^3CO$ is an acyl radical of caproic acid, caprylic acid, capric acid, lauric acid, myristic acid, palmitic acid, palmitoleic acid, stearic acid, isostearic acid, oleic acid, elaidic acid, petroselinic acid, linoleic acid, linolenic acid, arachidic acid, gadoleic acid, behenic acid, or erucic acid, or of technical mixtures thereof, $R^4$ is a hydrogen atom or is a $C_1$ to $C_4$ alkyl group, and q is 3 and 4, and (G) water.

The pigment preparation of the invention may further optionally comprise one or more of the following constituents:

(D) 0, preferably 0.01 to 8.0 wt % of clay mineral thickeners selected from natural or alkali-activated montmorillonite phyllosilicate minerals, (E) 0, preferably 0.01 to 20.0 wt % of inorganic fillers, and (F) 0, preferably 0.01 to 30 wt % of other auxiliaries customary for producing aqueous pigment preparations, such as additional wetting agents, moisture retainers, solvents, defoamers, rheological additives, preservatives, buffer substances, and pH regulators.

The pigment preparations of the invention are stable to shearing, to drying up, and to storage, produce little or no foam during application, and possess an outstanding rheology.

Component (A) of the pigment preparations of the invention is preferably a finely divided, organic or inorganic, white or chromatic pigment or a mixture of different pigments.

An exemplary selection of particularly preferred organic pigments includes carbon black pigments, such as gas blacks or furnace blacks, for example; monoazo and disazo pigments, more particularly the Colour Index pigments Pigment Yellow 1, Pigment Yellow 3, Pigment Yellow 12, Pigment Yellow 13, Pigment Yellow 14, Pigment Yellow 16, Pigment Yellow 17, Pigment Yellow 73, Pigment Yellow 74, Pigment Yellow 81, Pigment Yellow 83, Pigment Yellow 87, Pigment Yellow 97, Pigment Yellow 111, Pigment Yellow 126, Pigment Yellow 127, Pigment Yellow 128, Pigment Yellow 155, Pigment Yellow 174, Pigment Yellow 176, Pigment Yellow 191, Pigment Yellow 213, Pigment Yellow 214, Pigment Red 38, Pigment Red 144, Pigment Red 214, Pigment Red 242, Pigment Red 262, Pigment Red 266, Pigment Red 269, Pigment Red 274, Pigment Orange 13, Pigment Orange 34, or Pigment Brown 41; β-naphthol and naphthol AS pigments, more particularly the Colour Index pigments Pigment Red 2, Pigment Red 3, Pigment Red 4, Pigment Red 5, Pigment Red 9, Pigment Red 12, Pigment Red 14, Pigment Red 53:1, Pigment Red 112, Pigment Red 146, Pigment Red 147, Pigment Red 170, Pigment Red 184, Pigment Red 187, Pigment Red 188, Pigment Red 210, Pigment Red 247, Pigment Red 253, Pigment Red 254, Pigment Red 256, Pigment Orange 5, Pigment Orange 38, or Pigment Brown 1; laked azo and metal complex pigments, more particularly the Colour Index pigments Pigment Red 48:2, Pigment Red 48:3, Pigment Red 48:4, Pigment Red 57:1, Pigment Red 257, Pigment Orange 68, or Pigment Orange 70; benzimidazoline pigments, more particularly the Colour Index pigments Pigment Yellow 120, Pigment Yellow 151, Pigment Yellow 154, Pigment Yellow 175, Pigment Yellow 180, Pigment Yellow 181, Pigment Yellow 194, Pigment Red 175, Pigment Red 176, Pigment Red 185, Pigment Red 208, Pigment Violet 32, Pigment Orange 36, Pigment Orange 62, Pigment Orange 72, or Pigment Brown 25; isoindolinone and isoindoline pigments, more particularly the Colour Index pigments Pigment Yellow 139 or Pigment Yellow 173; phthalocyanine pigments, more particularly the Colour Index pigments Pigment Blue 15, Pigment Blue 15:1, Pigment Blue 15:2, Pigment Blue 15:3, Pigment Blue 15:4, Pigment Blue 15:6, Pigment Blue 16, Pigment Green 7, or Pigment Green 36; anthanthrone, anthraquinone, quinacridone, dioxazine, indanthrone, perylene, perinone, and thioindigo pigments, more particularly the Colour Index pigments Pigment Yellow 196, Pigment Red 122, Pigment Red 149, Pigment Red 168, Pigment Red 177, Pigment Red 179, Pigment Red 181, Pigment Red 207, Pigment Red 209, Pigment Red 263, Pigment Blue 60, Pigment Violet 19, Pigment Violet 23, or Pigment Orange 43; and triarylcarbonium pigments, more particularly the Colour Index pigments Pigment Red 169, Pigment Blue 56, or Pigment Blue 61.

Examples of suitable inorganic pigments are titanium dioxides, zinc sulfides, zinc oxides, iron oxides, magnetites, manganese iron oxides, chromium oxides, ultramarine, nickel or chromium antimony titanium oxides, manganese titanium rutiles, cobalt oxides, mixed oxides of cobalt and aluminum, rutile mixed phase pigments, rare earth sulfides, spinels of cobalt with nickel and zinc, spinels based on iron and chromium with copper, zinc, and manganese, bismuth vanadates, and extender pigments. Used more particularly are the Colour Index pigments Pigment Yellow 184, Pigment Yellow 53, Pigment Yellow 42, Pigment Yellow Brown 24, Pigment Red 101, Pigment Blue 28, Pigment Blue 36, Pigment Green 50, Pigment Green 17, Pigment Black 11, Pigment Black 33, and Pigment White 6. Preference is also frequently given to using mixtures of inorganic pigments. Mixtures of organic with inorganic pigments are likewise frequently used.

Component (B) of the pigment preparations of the invention is a phosphatide or phospholipid. In one particular embodiment, component (B) is a phosphatidylcholine of the formula (III)

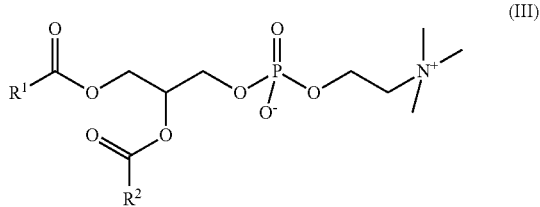

in which

R¹ is a linear, saturated or unsaturated aliphatic $C_7$ to $C_{17}$ radical,

R² is a linear, saturated or unsaturated aliphatic $C_7$ to $C_{17}$ radical identical to or different from R¹.

R¹ and R² are preferably alkyl or alkenyl radicals.

Phosphatidylcholine is an essential constituent of egg lecithin and soya lecithin and is composed of fatty acids, glycerol, phosphoric acid, and choline. The fatty acids present are lauric acid, myristic acid, palmitic acid, stearic acid, oleic acid, linoleic acid, and linolenic acid, primarily palmitic acid and oleic acid. Soya lecithin is present in the oil from the soybean. By cleaning and grinding of the soybean and by extraction processes, the raw soya oil is obtained, containing approximately 2% lecithin. Further extraction procedures are used to obtain a soya lecithin having a purity of 60-70%.

Component (C) of the pigment preparations of the invention is a polyhydroxy fatty acid amide, more particularly alkylglucamide. One preferred group for component C comprises polyhydroxy fatty acid amides of the formula (II),

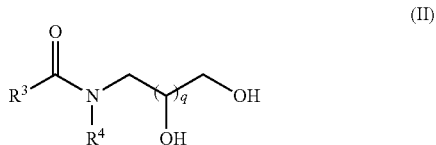

in which R³CO is the acyl radical of caproic acid, caprylic acid, capric acid, lauric acid, myristic acid, palmitic acid, palmitoleic acid, stearic acid, isostearic acid, oleic acid, elaidic acid, petroselinic acid, linoleic acid, linolenic acid, arachidic acid, gadoleic acid, behenic acid, or erucic acid, or of technical mixtures thereof. R⁴ is a hydrogen atom or is a $C_1$ to $C_4$ alkyl group, and q is 3 and 4. The polyhydroxy fatty acid amides derive preferably from reducing sugars having 5 or 6 carbon atoms, more particularly from glucose, and in that case represent fatty acid N-alkyl-glucamides. Particularly preferred are fatty acid N-alkylglucamides of the formula (V) which are obtained by reductive amination of glucose with methylamine and subsequent acylation with $C_{8/10}$ fatty acid mixtures, lauric acid or $C_{12}/C_{14}$ coconut fatty acid and/or a corresponding derivative, examples being the alkyl esters thereof.

Component (D) is a clay mineral thickener based on natural or alkali-activated montmorillonite phyllosilicate minerals. Montmorillonite is the main constituent of bentonite and possesses a high ion exchange capacity. When water is added, the mineral expands by a multiple of the original size, thereby raising the viscosity of the aqueous dispersion. Montmorillonite as clay mineral thickener can be added to the pigment preparation of the invention in order to retard or prevent the settling of organic and inorganic pigments and fillers and the syneresis—that is, the formation of a second phase with a different composition.

Component (E) is an inorganic filler, which may be added to the pigment preparations of the invention in order to raise their density and modify the flow behavior. In the case of volumetric metering and low pigment concentration or lightweight organic pigments, it may be possible that the pigment preparation is difficult to feed into the metering equipment, since the gravitational force is not sufficient to empty the liquid pigment preparation into the paint can. In other cases, at low pigment concentrations, the viscosity of the pigment preparations is too low, leading to dripping. In both cases, colorless inorganic fillers may be added to the pigment preparations of the invention, in order to raise the density of the pigment preparation and to improve the flow behavior. Suitable fillers are calcium carbonates such as naturally occurring chalk and precipitated calcium carbonate, dolomite, natural silicon dioxide (finely ground quartz), fumed and precipitated silicas, kieselguhr, aluminum oxides, aluminum hydroxides, talc, kaolin, mica (potassium aluminum silicate hydrate), barium sulfates such as naturally occurring heavy spars, and precipitated blanc fixe.

Components (F) are further auxiliaries customary for the production of aqueous pigment preparations, such as additional moisture retainers, solvents, defoamers, rheological additives, preservatives, buffer substances, and pH regulators.

Suitable moisture retainers and solvents are preferably glycol ethers, by which are meant here compounds having ethoxy and/or propoxy groups and having average molar masses of between 200 and 20 000 g/mol, more particularly polyethylene glycol ethers or polypropylene glycol ethers having an average molar mass of between 200 and 20 000 g/mol, mono-, di-, or triethylene glycol, mono-, di-, or tripropylene glycol, methyl-, ethyl-, propyl-, butyl-, or higher alkyl-polyalkylene glycol ethers having 1, 2, 3, or more ethylene glycol or propylene glycol units such as, for example, methoxypropanol, dipropylene glycol monomethyl ether, tripropylene glycol monomethyl ether, ethylene glycol monobutyl ether, diethylene glycol monobutyl ether, butylpolyethylene glycol ether, propylpolyethylene glycol ether, ethylpolyethylene glycol ether, methylpolyethylene glycol ether, dimethylpolyethylene glycol ether, dimethylpolypropylene glycol ether, and glycerol ethoxylates having a molecular weight of 200 to 20 000 g/mol.

Figures for molecular weights of polymers are always based on their number-average molecular weight, unless indicated otherwise in any particular case. Molecular weights can be determined by GPC against polyethylene glycol as standard.

Further suitable auxiliaries in the aqueous pigment preparations of the invention are preferably water-soluble organic or hydrotropic substances, which optionally also serve as solvents. Particularly suitable, for example, are formamide, urea, glycerol, diglycerol, and polyglycerol.

Suitable defoamers are preferably mineral oil defoamers and emulsions thereof, silicone oil defoamers and silicone oil emulsions, polyalkylene glycols, polyalkylene glycol fatty acid esters, fatty acids, higher alcohols, phosphoric esters, hydrophobically modified silica, aluminum tristearate, polyethylene waxes, and amide waxes.

Particularly preferred are defoamers which consist of finely divided, natural waxes in natural fatty acid glycerides or fatty acid methylesters as solvents, and which may be considered to be biobased defoamers.

Suitable further rheology additives as agents for regulating the viscosity are, for example, starch derivatives and cellulose derivatives or fumed silica.

In-can preservatives are added to stabilize the aqueous pigment preparations and to prevent the uncontrolled multiplication of bacteria, algae, and fungi. Suitable biocides are formaldehyde, formaldehyde donor compounds, methylisothiazolinone, chloromethylisothiazolinone, benzisothiazolinone, bronopol, dibromodicyanobutane, and silver chloride-coated titanium dioxide.

Buffer substances and pH regulators employed are preferably organic or inorganic bases and acids. Preferred organic bases are amines, such as ethanolamine, diethanolamine, triethanolamine, N,N-dimethylethanolamine, diisopropylamine, 2-amino-2-methyl-1-propanol, or dimethylaminomethylpropanol, for example. Preferred inorganic bases are sodium hydroxide, potassium hydroxide, and lithium hydroxide, or ammonia.

Water used in preparing the aqueous pigment preparations of the invention, component (G), is employed preferably in the form of distilled or demineralized water. Drinking water (mains water) as well, and/or water of natural origin, may be used. Water is present in the aqueous pigment preparation of the invention at preferably 10 to 75 wt %, more particularly ad 100 wt %.

The aqueous pigment preparations of the invention preferably have a viscosity of 10 to 10 000 mPas, preferably 30 to 5000 mPas, and more preferably 50 to 3000 mPas, measured with a cone/plate viscometer at a shear rate of $1/60 \sec^{-1}$, e.g., with a Haake viscometer 550.

The aqueous pigment preparations of the invention are miscible with water in any proportion, and a plurality of different preparations can also be mixed with water. The preparations are notable, relative to conventional pigment preparations, for outstanding stability in storage, and good rheological properties.

The present invention also provides a method for producing the pigment preparations of the invention, by dispersing component (A) in the form of powder or granules in the presence of water (G) and also of components (B), (C), and optionally (D), (E), and (F) in an intrinsically conventional way, then optionally admixing further water (G), and adjusting the obtaining aqueous pigment dispersion with water to the desired concentration. The liquid components (B), (C), (G), and optionally (F) are preferably mixed and homogenized, then the solid, pulverulent, granulated, or flake-form component (A), (D), and (E) are stirred into the mixture introduced initially, with the pigment and optionally the fillers being pasted and subjected to preliminary dispersing. Depending on the harshness of the pigments used, this is followed by fine dispersion or fine distribution with the aid of a milling or dispersing assembly, optionally with cooling. For this purpose, use may be made of stirring mechanisms, dissolvers (sawtooth stirrers), rotor-stator mills, ball mills, agitated ball mills such as sand mills and bead mills, high-speed mixers, kneading apparatus, roll mills, or high-performance bead mills. The fine dispersing and/or milling of the pigments takes place until the desired particle size distribution is reached, and may be carried out at temperatures in the range from 0 to 100° C., usefully at a temperature between 10 and 70° C., preferably at 20 to 60° C. After fine dispersing has taken place, the pigment preparation may be diluted further with water, preferably deionized or distilled water.

The pigment preparations of the invention are suitable for pigmenting and coloring macromolecular materials of all kinds. In particular the pigment preparations of the invention are suitable for pigmenting and producing emulsion and other paints, dispersion-based varnishes, printing inks, including for example textile, flexographic, decorative or gravure printing inks, wallpaper inks, water-thinnable varnishes, wood stains, wood preservative systems, and coatings for the surface coating of articles made, for example, of metal, wood, plastic, glass, ceramic, concrete, textile material, paper, or rubber.

A particular feature of the pigment preparations of the invention is their use as universal tinting pastes. Universal tinting pastes are suitable not only for coloring aqueous paints but also for tinting solventborne varnishes. Customary dispersants for aqueous pigment preparations stabilize the pigments only in aqueous systems, but not in solventborne systems. If aqueous pigment preparations are used for coloring solventborne varnishes, there may be agglomeration of the pigments and there may be floating of the agglomerated pigments in the varnish. On application of the varnishes by brush, roller, or by spray application, streakiness may be a result, as may also be a rough paint outcome as a result of differences in shade, because the pigments undergo flocculation in the paint and during the drying process, and so the color strength is reduced. When the colored varnishes are applied, the pigment agglomerates are separated again, but to different extents, and hence the shade differences observed come about. In the laboratory, this phenomenon is simulated in the rubout test, which is described in U.S. Pat. No. 3,840,383.

EXAMPLES

Production of the Pigment Preparation

The pigment, in the form alternatively of powder, granules, or presscake, is pasted in deionized water, together with the dispersants and the other additions, and then homogenized and subjected to preliminary dispersion, using a dissolver (e.g., from VMA-Getzmann GmbH, model AE3-M1) or other suitable apparatus. For the purpose of dispersion, the liquid components (B), (C), and (F) will be introduced into a grinding vessel and mixed. Then the pulverulent components (A) and optionally (D) and (E) are added and subjected to preliminary dispersion with the dissolver.

The subsequent fine dispersing takes place by means of a bead mill (e.g., the AE3-M1 from VMA-Getzmann) or else of another suitable dispersing assembly, with grinding taking place using siliquarzite beads or zirconium mixed oxide beads with a size of d=1 mm, accompanied by cooling, until the desired color strength and coloristic properties are obtained. The final pigment concentration desired is then set using deionized water, and the grinding media are separated off, and the pigment preparation is isolated.

Testing of Varnish Compatibility and Color Strength

The pigment preparation is stored at 60° C. for a week and inspected. The viscosity of the pigment preparation is measured at 25° C. using a Haake viscometer 550 at a shear rate of $1/60 \sec^{-1}$ or, in the case of highly fluid pigment preparations, using a Brookfield viscometer, model DV-II, with spindle 3 at 100 rpm. For the determination of the color strength and the compatibility, the pigment preparations are added respectively to an aqueous white emulsion paint and to a mineral oil-containing long-oil alkyd varnish. For the testing of the color strength and compatibility, 200 g of each of the tinted paints, consisting of 92 wt % of base varnish and 8 wt % of the pigment preparation, are introduced into a metal can and homogenized for 60 seconds in an Inkshaker 500 from Olbrich Know-how, Hemer. After one day, the tinted paints are coated out onto a test card, using a 120 μm doctor blade on a film-drawing apparatus, model 509 MC, from Erichsen GmbH, Hemer. The rubout test is performed on the drying paint films in the manner described in the specification U.S. Pat. No. 3,840,383.

The pigment preparations described in the examples below were produced by the method described above, the following constituents being used in the stated amounts in such a way as to give 100 parts of each pigment preparation. In the present specification, "parts" means parts by weight and percentages are weight percentages, unless indicated otherwise in any specific case.

Examples of Pigment Preparations with Inorganic Pigments

Example 1

| | |
|---|---|
| 60.0 parts | C.I. Pigment Yellow 42 (Bayferrox ® Yellow 3920, Lanxess, component (A)), |
| 6.0 parts | technical-grade soya lecithin (Lecico F 200, Lecico GmbH, component (B)), |
| 6.0 parts | $C_8/C_{10}$-fatty acid N-methylglucamide (component (C)), |
| 10.0 parts | glycerol (component (F)), |
| 0.3 parts | defoamer (D-Foam-R C 740, Clariant, component (F)), |
| 0.2 parts | preservative (Nipacide ® BSM, Clariant, component (F)), |
| 17.5 parts | water (component (G)) |

After storage for one week at 60° C., the pigment preparation is liquid, homogeneous, and foam-free. The viscosity of the pigment preparation is 690 mPa·s, measured using a Haake cone/plate viscometer.

Example 2 (Comparison Example)

| | |
|---|---|
| 60.0 parts | C.I. Pigment Yellow 42 (Bayferrox ® Yellow 3920, Lanxess, component (A)), |
| 6.0 parts | technical-grade soya lecithin (Lecico F 200, Lecico GmbH, component (B)), |
| 6.0 parts | oleic acid reacted with 6 mol of ethylene oxide (Genagen ® O 060, Clariant, component (C)), |
| 10.0 parts | glycerol (component (F)), |
| 0.3 parts | defoamer (D-Foam-R C 740, Clariant, component (F)), |
| 0.2 parts | preservative (Nipacide ® BSM, Clariant, component (F)), |
| 17.5 parts | water (component (G)) |

Water and the additives are introduced initially. On addition of the pigment, the mixture solidifies.

Example 3

| | |
|---|---|
| 60.0 parts | C.I. Pigment Red 101 (Bayferrox ® Red 130, Lanxess, component (A)), |
| 2.5 parts | technical-grade soya lecithin (Lecico F 200, Lecico GmbH, component (B)), |
| 6.0 parts | $C_8/C_{10}$-fatty acid N-methylglucamide (component (C)), |
| 10.0 parts | glycerol (component (F)), |
| 0.3 parts | defoamer (D-Foam-R C 740, Clariant, component (F)), |
| 0.2 parts | preservative (Nipacide ® BSM, Clariant, component (F)), |
| 21.0 parts | water (component (G)) |

After storage for one week at 60° C., the pigment preparation is liquid, homogeneous, and foam-free. The viscosity of the pigment preparation is 510 mPa·s, measured using a Haake cone/plate viscometer.

Example 4

| | |
|---|---|
| 60.0 parts | C.I. Pigment Red 101 (Bayferrox ® Red 130, Lanxess, component (A)), |
| 2.5 parts | technical-grade soya lecithin (Lecico F 200, Lecico GmbH, component (B)), |
| 6.0 parts | $C_{12}/C_{14}$-fatty acid N-methylglucamide (component (C)), |
| 10.0 parts | glycerol (component (F)), |
| 0.3 parts | defoamer (D-Foam-R C 740, Clariant, component (F)), |
| 0.2 parts | preservative (Nipacide ® BSM, Clariant, component (F)), |
| 21.0 parts | water (component (G)) |

After storage for one week at 60° C., the pigment preparation is liquid, homogeneous, and foam-free. The viscosity of the pigment preparation is 650 mPa·s, measured using a Haake cone/plate viscometer.

Example 5

| | |
|---|---|
| 60.0 parts | C.I. Pigment Black 11 (Bayferrox ® Black 316, Lanxess, component (A)), |
| 2.5 parts | technical-grade soya lecithin (Lecico F 200, Lecico GmbH, component (B)), |
| 6.0 parts | $C_8/C_{10}$-fatty acid N-methylglucamide (component (C)), |
| 10.0 parts | glycerol (component (F)), |
| 0.3 parts | defoamer (D-Foam-R C 740, Clariant, component (F)), |
| 0.2 parts | preservative (Nipacide ® BSM, Clariant, component (F)), |
| 21.0 parts | water (component (G)) |

After storage for one week at 60° C., the pigment preparation is liquid, homogeneous, and foam-free. The viscosity of the pigment preparation is 490 mPa·s, measured using a Haake cone/plate viscometer.

Examples of Pigment Preparations with Organic Pigments

Example 6

| | |
|---|---|
| 21.0 parts | C.I. Pigment Blue 15:3 (Hostaperm ® Blue B2G, Clariant, component (A)), |
| 2.5 parts | technical-grade soya lecithin (Lecico F 200, Lecico GmbH, component (B)), |
| 6.0 parts | $C_8/C_{10}$-fatty acid N-methylglucamide (component (C)), |
| 2.0 parts | montmorillonite clay mineral thickener and antisettling agent (Ceratofix ® VP, Clariant, component (D)), |
| 18.0 parts | barium sulfate (Blanc Fixe micro, Rockwood Pigments, component (E)), |
| 10.0 parts | glycerol (component (F)), |
| 0.3 parts | defoamer (D-Foam-R C 740, Clariant, component (F)), |
| 0.2 parts | preservative (Nipacide ® BSM, Clariant, component (F)), |
| 40.0 parts | water (component (G)) |

After storage for one week at 60° C., the pigment preparation is liquid, homogeneous, and foam-free. The viscosity of the pigment preparation is 170 mPa·s, measured using a Brookfield viscometer using spindle 3 at 100 rpm.

Example 7

| 6.0 parts | C.I. Pigment Black 7 (Special Black 4, Evonik, component (A)), |
|---|---|
| 2.5 parts | technical-grade soya lecithin (Lecico F 200, Lecico GmbH, component (B)), |
| 6.0 parts | $C_8/C_{10}$-fatty acid N-methylglucamide (component (C)), |
| 1.0 part | montmorillonite clay mineral thickener and antisettling agent (Ceratofix ® VP, Clariant, component (D)), |
| 26.0 parts | barium sulfate (Blanc Fixe micro, Rockwood Pigments, component (E)), |
| 10.0 parts | glycerol (component (F)), |
| 0.3 parts | defoamer (D-Foam-R C 740, Clariant, component (F)), |
| 0.2 parts | preservative (Nipacide ® BSM, Clariant, component (F)), |
| 48.0 parts | water (component (G)) |

After storage for one week at 60° C., the pigment preparation is liquid, homogeneous, and foam-free. The viscosity of the pigment preparation is 260 mPa·s, measured using a Brookfield viscometer using spindle 3 at 100 rpm.

Example 8

| 13.0 parts | C.I. Pigment Red 112 (Permanent ® Red FGR, Clariant, component (A)), |
|---|---|
| 2.5 parts | technical-grade soya lecithin (Lecico F 200, Lecico GmbH, component (B)), |
| 6.0 parts | $C_8/C_{10}$-fatty acid N-methylglucamide (component (C)), |
| 2.0 parts | montmorillonite clay mineral thickener and antisettling agent (Ceratofix ® VP, Clariant, component (D)), |
| 25.0 parts | barium sulfate (Blanc Fixe micro, Rockwood Pigments, component (E)), |
| 10.0 parts | glycerol (component (F)), |
| 0.3 parts | defoamer (D-Foam-R C 740, Clariant, component (F)), |
| 0.2 parts | preservative (Nipacide ® BSM, Clariant, component (F)), |
| 41.0 parts | water (component (G)) |

After storage for one week at 60° C., the pigment preparation is liquid, homogeneous, and foam-free. The viscosity of the pigment preparation is 120 mPa·s, measured using a Brookfield viscometer using spindle 3 at 100 rpm.

The invention claimed is:

1. An aqueous, binder-free pigment preparation comprising
(A) 1.0 to 75.0 wt % of at least one organic or inorganic white or chromatic pigment or a mixture of different organic and inorganic white or chromatic pigments,
(B) 0.01 to 8.0 wt % of at least one phosphatide of the formula (I),

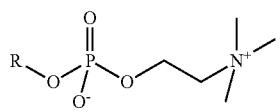

in which
R is an aliphatic radical comprising a total of up to 50 atoms selected from the group consisting of carbon, hydrogen, and oxygen atoms, and optionally nitrogen and sulfur atoms,
(C) 0.01 to 12.0 wt % of a polyhydroxy fatty acid amide of the formula (II)

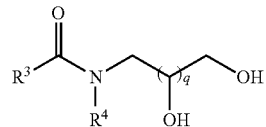

in which $R^3CO$ is an acyl radical of caproic acid, caprylic acid, capric acid, lauric acid, myristic acid, palmitic acid, palmitoelic acid, stearic acid, isostearic acid, oleic acid, elaidic acid, pertroselinic acid, linoleic acid, linolenic acid, arachidic acid, gadoleic acid, behenic acid, or erucic acid, or of technical mixtures thereof, $R^4$ is a hydrogen atom or is a $C_1$ to $C_4$ alkyl group, and q is 3 or 4, and
(G) water.

2. The aqueous, binder-free pigment preparation as claimed in claim 1, wherein component (B) is a phosphatidylcholine of the formula (III)

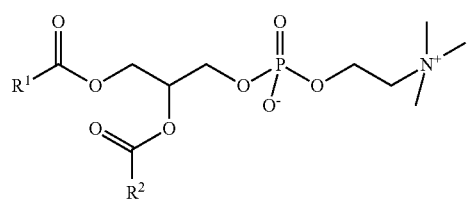

in which
$R^1$ is a linear, saturated or unsaturated aliphatic $C_7$ to $C_{17}$ radical and
$R^2$ is a linear, saturated or unsaturated aliphatic $C_8$ to $C_{18}$ radical identical to or different from $R^1$.

3. The aqueous, binder-free pigment preparation as claimed in claim 2, wherein the radicals R, $R^1CO$ and $R^2CO$ are acyl radicals derived from lauric acid, myristic acid, palmitic acid, stearic acid, oleic acid, linoleic acid, linolenic acid, or mixtures thereof.

4. The aqueous, binder-free pigment preparation as claimed in claim 1, wherein component (C) is a polyhydroxy fatty acid amide of the formula (II),

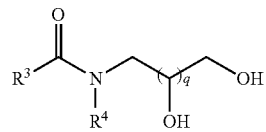

in which $R^3CO$ is an acyl radical of caproic acid, caprylic acid, capric acid, lauric acid, myristic acid, palmitic acid, palmitoelic acid, stearic acid, isostearic acid, oleic acid, elaidic acid, pertroselinic acid, linoleic acid, linolenic acid, arachidic acid, gadoleic acid, behenic acid, or erucic acid, or of technical mixtures thereof, $R^4$ is a hydrogen atom or is a $C_1$ to $C_4$ alkyl group, and q is 3 and 4.

5. The aqueous, binder-free pigment preparation as claimed in claim 1, in which component (C) is a fatty acid N-alkylglucamide of the formula (II) which is obtained by reductive amination of glucose with methylamine and subsequent acylation with a $C_8$ to $C_{14}$ fatty acid or a reactive derivative selected from the group consisting of methyl esters or halides.

6. The aqueous, binder-free pigment preparation as claimed in claim 1, comprising 1 to 7 wt % of a phosphatide of the formula (I).

7. The aqueous, binder-free pigment preparation as claimed in claim 1, comprising 1 to 10 wt % of a polyhydroxy fatty acid amide.

8. The aqueous, binder-free pigment preparation as claimed in claim 1, comprising 10 to 75 wt % of water.

9. The aqueous, binder-free pigment preparation as claimed in claim 1, having a viscosity of 10 to 10 000 mPas, determined with a cone/plate viscometer at a shear rate of 1/60 sec-1.

10. The aqueous, binder-free pigment preparation as claimed in claim 1, further comprising
    (D) 0.01-8.0 wt % of clay mineral thickeners based on natural or alkali-activated montmorillonite phyllosilicate minerals.

11. The aqueous, binder-free pigment preparation as claimed in claim 1, further comprising
    (E) 0.01-20.0 wt % of inorganic fillers.

12. The aqueous, binder-free pigment preparation as claimed in claim 1, further comprising
    (F) 0.01 to 30 wt % of other auxiliaries customary for producing aqueous, binder-free pigment preparations and selected from the group consisting of wetting agents, moisture retainers, solvents, defoamers, rheological additives, preservatives, buffer substances, and pH regulators.

13. The aqueous, binder-free pigment preparation as claimed in claim 12, comprising up to 15 wt % of at least one moisture retainer or solvent, selected from the group consisting of glycerol and from glycol ethers having 200 to 20 000 g/mol number-average molecular weight.

14. The aqueous, binder-free pigment preparation as claimed in claim 12, comprising up to 2 wt % of defoamers.

15. The aqueous, binder-free pigment preparation as claimed in claim 12, comprising up to 1 wt % of an in-can preservative.

16. A process for coloring a macromolecular material, coating material, paint, or, ink, comprising the step of adding at least one aqueous, binder-free pigment preparation comprising
    (A) 1.0 to 75.0 wt % of at least one organic or inorganic white or chromatic pigment or a mixture of different organic and inorganic white or chromatic pigments,
    (B) 0.01 to 8.0 wt % of at least one phosphatide of the formula (I),

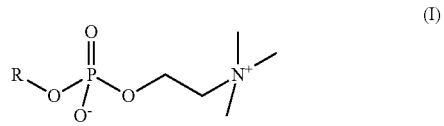

in which
R is an aliphatic radical comprising a total of up to 50 atoms selected from the group consisting of carbon, hydrogen, and oxygen atoms, and optionally nitrogen and sulfur atoms,
    (C) 0.01 to 12.0 wt % of a polyhydroxy fatty acid amide of the formula (II)

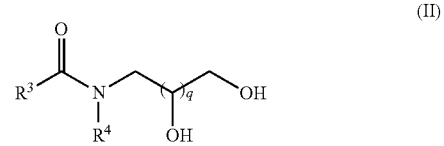

in which $R^3CO$ is an acyl radical of caproic acid, caprylic acid, capric acid, lauric acid, myristic acid, palmitic acid, palmitoelic acid, stearic acid, isostearic acid, oleic acid, elaidic acid, pertroselinic acid, linoleic acid, linolenic acid, arachidic acid, gadoleic acid, behenic acid, or erucic acid, or of technical mixtures thereof, $R^4$ is a hydrogen atom or is a $C_1$ to $C_4$ alkyl group, and q is 3 and 4, and
    (G) water to the macromolecular material, coating material, paint or ink.

17. A macromolecular material, coating material, paint or ink, comprising at least one aqueous, binder-free pigment preparation as claimed in claim 1.

18. A process for printing a two-dimensional sheet structure comprising the step of contacting the two-dimensional sheet structure with at least one macromolecular material, coating material, paint or ink, as claimed in claim 17.

* * * * *